(12) United States Patent
Kelley et al.

(10) Patent No.: US 7,787,357 B2
(45) Date of Patent: Aug. 31, 2010

(54) OFDM FREQUENCY OFFSET ESTIMATION APPARATUS AND METHOD

(75) Inventors: Brian Todd Kelley, Austin, TX (US); Sekchin Chang, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 1761 days.

(21) Appl. No.: 10/740,291

(22) Filed: Dec. 18, 2003
(Under 37 CFR 1.47)

(65) Prior Publication Data
US 2005/0135432 A1 Jun. 23, 2005

(51) Int. Cl.
*H04J 11/00* (2006.01)
(52) U.S. Cl. .................................... 370/208; 375/343
(58) Field of Classification Search ........................ None
See application file for complete search history.

(56) References Cited

U.S. PATENT DOCUMENTS

| | | | |
|---|---|---|---|
| 6,061,406 A | 5/2000 | Carson et al. | |
| 6,330,291 B1* | 12/2001 | Agrawal et al. | 375/326 |
| 6,438,367 B1 | 8/2002 | Crawford | |
| 6,487,252 B1 | 11/2002 | Kleider et al. | |
| 6,671,334 B1* | 12/2003 | Kuntz et al. | 375/340 |
| 7,170,956 B1* | 1/2007 | Fong et al. | 375/344 |
| 7,406,102 B2* | 7/2008 | Boesel et al. | 370/505 |
| 2002/0114398 A1* | 8/2002 | Lin et al. | 375/253 |
| 2003/0002471 A1* | 1/2003 | Crawford et al. | 370/343 |
| 2003/0026197 A1* | 2/2003 | Crawford | 370/203 |
| 2003/0152022 A1* | 8/2003 | Hosur | 370/208 |
| 2003/0152023 A1* | 8/2003 | Hosur et al. | 370/208 |
| 2004/0013209 A1* | 1/2004 | Zehavi et al. | 375/334 |
| 2004/0071104 A1* | 4/2004 | Boesel et al. | 370/320 |
| 2004/0141457 A1* | 7/2004 | Seo et al. | 370/203 |
| 2004/0190663 A1* | 9/2004 | Carsello et al. | 375/354 |
| 2005/0002461 A1* | 1/2005 | Giannakis et al. | 375/259 |
| 2005/0015818 A1* | 1/2005 | Kim et al. | 725/146 |
| 2006/0104333 A1 | 5/2006 | Rainbolt et al. | |
| 2007/0116159 A1* | 5/2007 | Popper | 375/344 |

OTHER PUBLICATIONS

Timothy M. Schmidl, & Donald C. Cox, Robust Frequency and Timing Synchronization for OFDM, Dec. 1997.
Simoens, Buzenac, & de Courville, A New method for Joint Cancellation of Clock and Carrier Frequency Offsets in OFDM receivers over Frequency selective Channels, 2000.
Edfor, Sandell, Beek, Landstrom, Sjoberg, An introduction to orthogonal frequency-divison Multiplexing, Sep. 1996.
Part 11: Wireless LAN Medium Access Control (MAC) and Physical Layer (PHY) Specifications High-speed Physical layer in the 5 GHz Band, 1999.
Liu & Giannakis, Carrier Frequency Offset Estimation for OFDM-Based WLANS, Mar. 2001.
International Search Report (6 Pages) for PCT/US04/40926 listing 6,438,367 as relevant art.

* cited by examiner

*Primary Examiner*—Phirin Sam
(74) *Attorney, Agent, or Firm*—Charles W. Bethards

(57) ABSTRACT

A frequency offset estimator (400) and corresponding method (600) provides a frequency offset estimate (415) for an OFDM signal. The estimator comprises a data parser (403) coupled to an input signal (401) and arranged to select a group of symbols (305-311) or corresponding samples corresponding to predetermined symbols from the input signal and a processor (405) arranged to provide a correlation corresponding to the symbols, where the correlation corresponds to a frequency offset estimation for the input signal and is determined in a sequential fashion so that the correlation is provided concurrently with the last symbol or sample of the group of symbols to be selected.

17 Claims, 3 Drawing Sheets

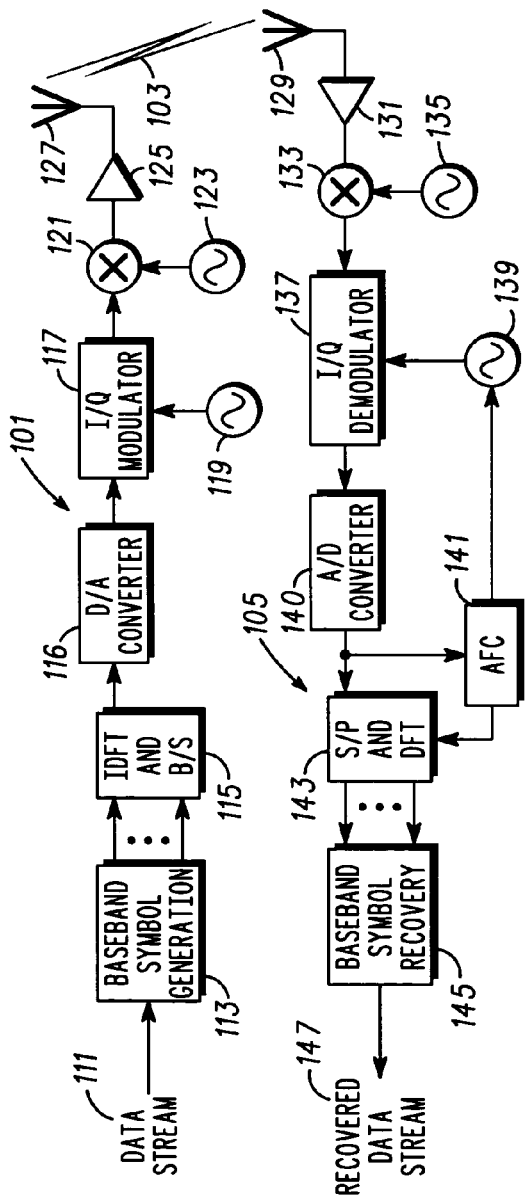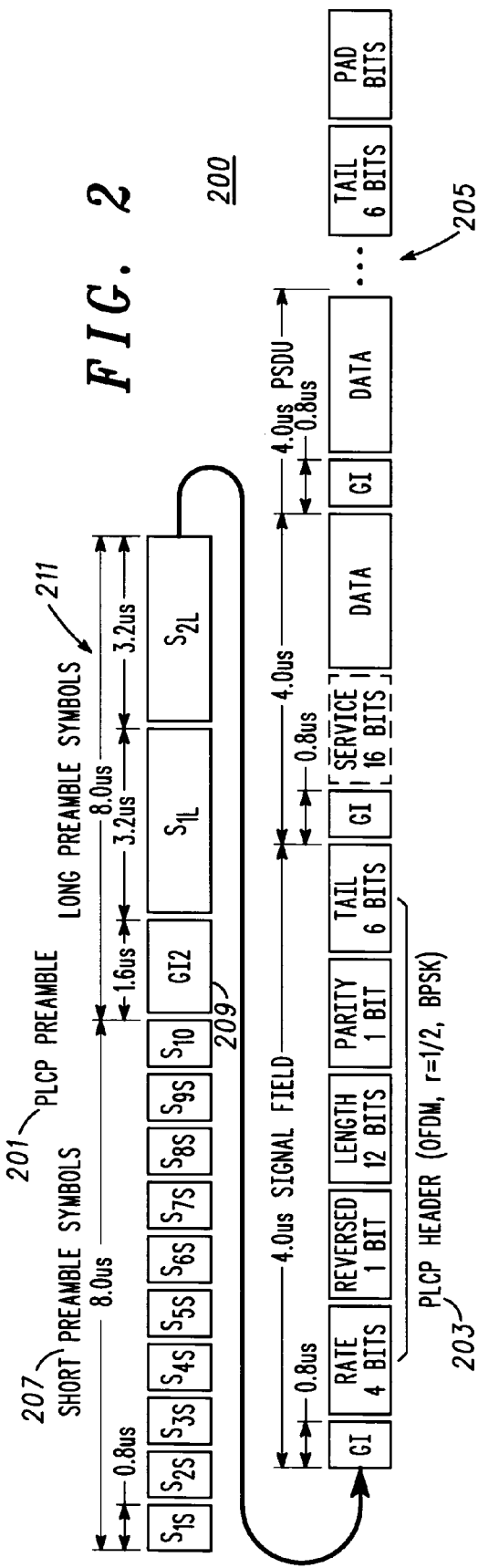

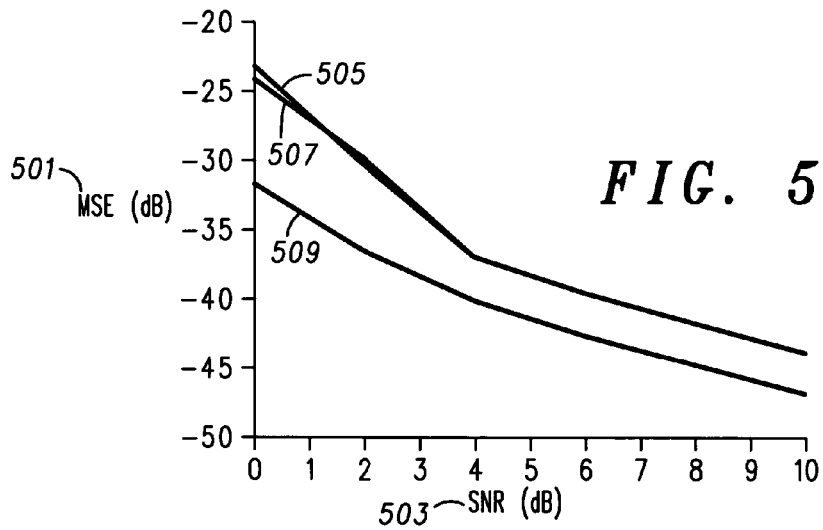
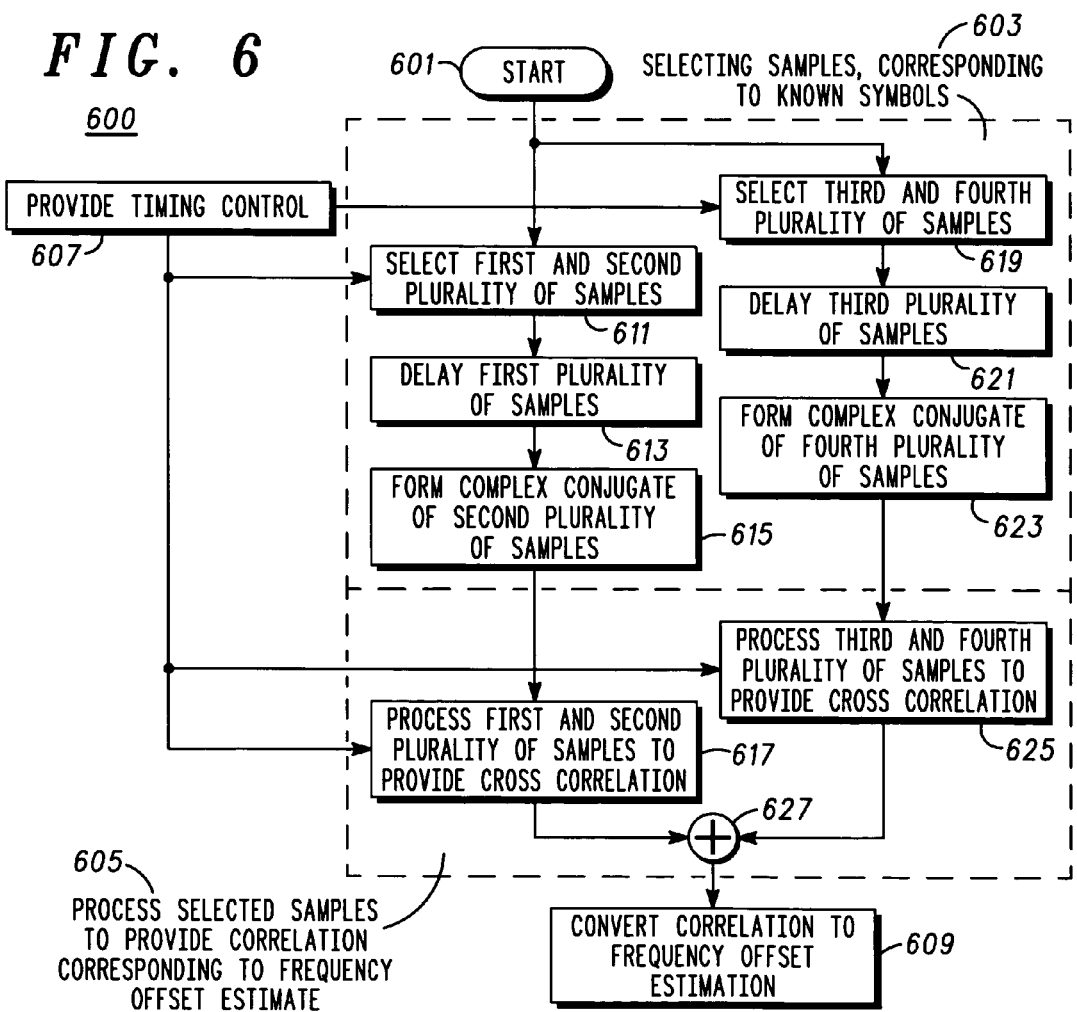

OFDM FREQUENCY OFFSET ESTIMATION APPARATUS AND METHOD

FIELD OF THE INVENTION

This invention relates in general to wireless communication systems and more specifically to apparatus and methods providing frequency offset estimations in orthogonal frequency division multiplexing systems.

BACKGROUND OF THE INVENTION

Wireless communication devices or units such as communication units and base transceivers providing data and voice services for users operating in corresponding systems are known. As these systems have evolved more sophisticated encoding and modulation schemes are being employed. Present systems often rely at least in part on schemes where orthogonality between signals is utilized to distinguish a signal from all others. Classic examples of such a systems are those employing Orthogonal Frequency Division Multiplexing (OFDM) modulation and protocols, such as those often used to provide Digital Subscriber Line (DSL) services, wireless local area network services using IEEE 802.11a protocol, and the like.

OFDM based protocols are often employed due to the possibility of high transmission efficiencies usually assessed in information bits per second per hertz terms. These systems can be modeled as a plurality of carriers (sub-carriers) that are closely spaced in frequency with each carrier being modulated by a unique frequency offset value. Also, the relatively long symbol period compared to the channel delay spread mitigates frequency selective fading effects. These sub-carriers as modulated can be closely spaced since they are orthogonal and thus any interference can be negated at a target receiver. However, when these individual carriers as modulated are not orthogonal the inter-carrier interference effects cannot be negated and the available bit error rate increases dramatically. It has been shown that the orthogonality between the plurality of sub-carriers is strongly dependent on knowing with precision the frequency that was used to transmit the OFDM signals.

Wireless receivers and transmitters essentially never have the same frequency reference. Furthermore a wireless channel can contribute to differences between a transmitted and received frequency due for example to relative motion between the transmitter and receiver or reflectors impacting the wireless channel. Thus the receiver must determine or estimate the frequency offset between the receiver frequency and the OFDM signal that is being received. While techniques exist for making this estimate, they suffer from various problems, such as limited accuracy or excess complexity or delay in providing the estimate. It is almost always advantageous, particularly in a wireless receiver to use less computational complexity and incur minimal delay, especially in bursty information transfers. A need exists for improved methods and apparatus for estimating frequency offset for an OFDM signal.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 1 depicts, in a simplified and representative form, an OFDM system including a transmitter for transmitting and a receiver for receiving an OFDM signal;

FIG. 2 depicts an exemplary data frame including a preamble according to IEEE 802.11a standards;

FIG. 5 depicts an exemplary graph of performance results for the frequency offset estimator of FIG. 4; and FIG. 6 illustrates a flow chart of a method embodiment for estimating frequency offset for an OFDM signal.

DETAILED DESCRIPTION OF PREFERRED EMBODIMENTS

Figure 3:
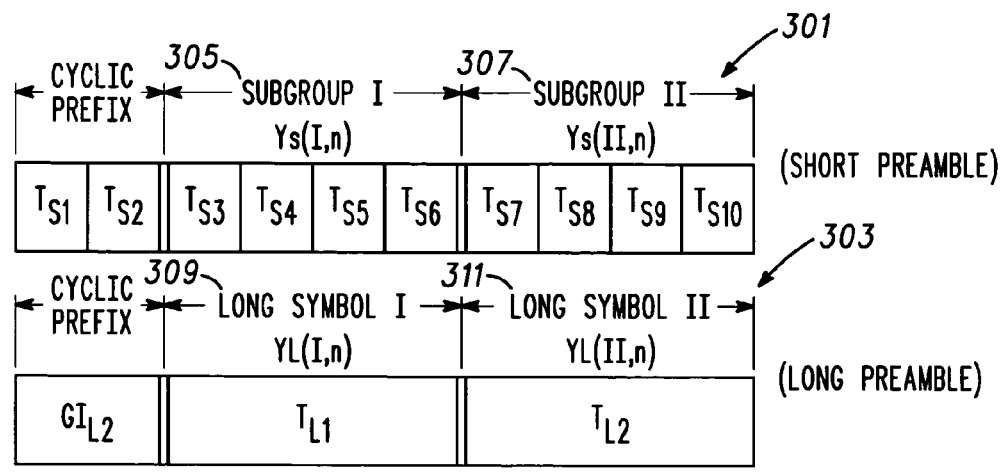
FIG. 3 depicts a preamble portion of the data frame of FIG. 2.

In overview, the present disclosure concerns communication systems including communication units or devices and methods and apparatus for enabling and affecting a frequency offset estimation that may advantageously be used in communication equipment, devices or units. More particularly various inventive concepts and principles embodied in communication systems, communication units, communication unit receivers, signal processors, frequency offset estimators, and corresponding methods therein or thereof for providing or facilitating a frequency offset estimation by determining, generating, computing, or calculating the estimation in a computationally efficient manner exhibiting minimal time delay are discussed and described. The frequency offset estimation may be provided by an estimator implemented, for example, in special purpose hardware in integrated circuit form or using a signal processor such as a digital signal processor executing appropriate software. The communication units may be referred to as subscriber devices and include wireless communication units such as cellular phones or two-way radios or messaging devices and the like. Note that the devices or units can be a variety of devices with differing functionality, including for example a personal digital assistant, personal assignment pad, and personal computers equipped for wired or wireless network operation, or equivalents thereof provided such equipment or units are arranged and constructed for operation in accordance with the principles and concepts described and discussed.

The principles and concepts discussed and described may be particularly applicable to communication units and systems that can provide or facilitate voice communication services or data or messaging services over wireless networks, such as wide area networks (WANs) or local area networks (W-LANs), where these systems utilize an OFDM based communication protocol. Such systems include, for example conventional two-way systems and devices and various cellular phone systems that use an OFDM based access technology, such as IEEE 802 protocols (specifically IEEE 802.11a, IEEE 802.15.3a, DVD-H), 4G OFDM systems such as IEEE 802.16, IEEE 802.20, and variants and evolutions thereof.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as digital signal processors or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative OFDM system including a transmitter 101 for transmitting an OFDM signal over a channel 103 and a receiver 105 for receiving an OFDM signal will be discussed and described. Many of the functions depicted in FIG. 1 are known and will not be discussed in detail. Generally a data stream 111 is coupled to a base band symbol generation unit 113 where forward error coding, interleaving and mapping occur to generate a plurality of signals that are coupled to an inverse discrete Fourier transform (IDFT) and parallel to serial converter unit 115. The plurality of signals is transformed and converted to a serial stream. The resultant signal has a guard interval or cyclic prefix added and is then coupled to a digital to analog converter 116 with an output coupled to an I/Q modulator that is driven by an oscillator 119. The output of the I/Q modulator 119 is up-converted to a transmit frequency by mixer 121 driven by a transmit local oscillator 123. Note that oscillator 119 and transmit local oscillator 123 are ordinarily referenced to the same frequency reference, such as a crystal oscillator. The output signal from the mixer 121 will be amplified by power amplifier 125 and coupled to a transmit antenna 127 where the OFDM signal is sent over the channel 103.

The OFDM signal as impacted by the channel 103 with added noise is coupled to a received antenna 129 and from there to a low noise amplifier 131. The output from the low noise amplifier 131 is coupled to a mixer 133, driven by a receive local oscillator 135, where the OFDM signal is down converted and further coupled to an I/Q demodulator 137 driven by an oscillator 139, where the receive local oscillator 135 and oscillator 139 are ordinarily referenced to the same frequency reference, such as a crystal oscillator. After demodulation into respective I and Q components, the I and Q signals or components are coupled to analog to digital (A/D) converter 140 where they are converted to a digital form. The output from the A/D converter 140 is coupled to an automatic frequency control unit 141 that operates to provide a frequency offset estimate, further described below, and determine a time reference for the incoming signal. The frequency offset estimation is used to correct the frequency of oscillator 139 and the time reference is provided to a discrete Fourier transform (DFT) unit 143. The output from the A/D converter is coupled to the serial to parallel converter and DFT unit 143 where the serial stream is converted to parallel streams that are then transformed with the results being coupled to a baseband symbol recovery function 145. After appropriate decoding, etc. the baseband symbol recovery function 145 provides the recovered data stream 147.

Referring to FIG. 2 an exemplary data frame 200 including a preamble 201 in accordance with IEEE 802.11a standards will be discussed and described. The preamble 201 is a physical layer convergent protocol (PLCP) preamble that is part of a physical protocol data unit (PPDU) frame as specified by the IEEE 802.11a standards with the balance of the frame devoted to a PLCP header 203 and data 205. As with many OFDM based systems due to the critical nature of an accurate frequency offset estimation, predetermined symbols are located at predetermined locations within the frame 200 in order to facilitate both frequency and timing estimates. As depicted, there are 10 short and identical preamble symbols $S_{1S}$-$S_{10S}$ 207, each of which is 0.8 μsec. long, followed by a guard interval GI2 209 that is 1.6 μsec long, and then two long and identical preamble symbols, $S_{1L}$, $S_{2L}$ 211 that are each 3.2 μsec long. The guard interval 209 has been selected such that the impulse response of the channel is shorter than the interval and thus any channel response resulting, for example, from the short preamble symbols will have disappeared before the long preamble symbols occur. Typically these guard intervals are used to provide a cyclic extension for the symbols that follow, e.g. guard interval 209 will be filled with the last half of long preamble symbol $S_{2L}$, when the data frame 200 is transmitted. Generally the short preamble symbols are intended for use in providing a course frequency offset estimate as well as timing estimate or synchronization data while the long preamble symbols 211 are used for a finer frequency offset estimation.

Present techniques that attempt to use both the short and long preamble symbols for frequency offset estimation suffer from undue computational complexity and thus may not be suitable for certain communication units, such as low cost or battery life conscious units.

Suppose that we let $s_k(t)$ be defined as the k'th OFDM symbol. Then, we can write $$s_k(t) = \begin{cases} \dfrac{1}{\sqrt{T-T_g}} \sum_{m=0}^{N-1} c_k(m)\exp\left[j2\pi\dfrac{B}{N}m(t-T_g)\right] \\ 0 \end{cases}$$

for $t \in [0, N/B + T_g = T]$, where B is the signal bandwidth, T is the period of an OFDM symbol, $T_g$ is the time duration of a cyclic prefix guard band, $c_k(m)$ is the complex scalar associated with the m'th sub carrier of the k'th OFDM symbol, and N is the number of potential sub carriers. We note that the O'th OFDM symbol, $$s_0(t) = \dfrac{1}{\sqrt{T-T_g}} c_0(m)\exp\left[j2\pi\dfrac{B}{N}m(t-T_g)\right]$$

for $t \in [0, N/B + T_g = T]$ is a $$\frac{B}{N}m$$

Hz modulated square wave in the time domain with period T. From this, we can define the transmitted signal as:

$$s(t) = \text{Re}\left\{\sum_{k=-\infty}^{\infty} s_k(t)\exp(-j2\pi f_c t)\right\}.$$

In the description to follow, the k'th short and long transmitted OFDM preamble symbols will be defined the as $s_{kS}(t)$ and $s_{kL}(t)$, respectively. At the receiver, the baseband signal sampled at the input to the A/D 140 with frequency offset, $f_o$, can be written as:

$$r(t) = \sum_{m=-\infty}^{\infty} s_m(t)\exp(j2\pi f_o t) + N(t),$$

where N(t) is modeled as a zero mean white Gaussian noise process with a variance of $\sigma_n^2$. Upon A/D sampling of the continuous baseband signal or waveform, the digital or discrete time output can be written as:

$$r(nT_s) = \sum_{m=-\infty}^{\infty} s_m(nT_s)\exp(j2\pi f_o nT_s) + $$

$$N(nT_s) \Rightarrow r(n) = \sum_{m=-\infty}^{\infty} s_m(n)\exp\left(j2\pi f_\xi \frac{n}{N}\right) + N(n)$$

where $f_\xi = f_0/(1/T)$ represents the normalize frequency offset and $$N = \frac{T}{T_s}$$

represents that number of discrete samples per OFDM symbol.

Referring to FIG. 3, a preamble portion of the data frame of FIG. 2 as received will be further discussed and described. As noted above the IEEE 802.11a standard and other similar standards specifies two types of preamble symbols 207, 211 that are known to the receiver and thus may be used as training symbols for estimation of a frequency offset in OFDM-based systems, such as a wireless LAN and the like. One type of training symbol 301 comprises the 10 identical short symbols 207, each of which contains Tshort×fs samples (Tshort is the period of a short symbol and fs is the sampling rate of the A/D). For fs=20 MHz, each short symbol consists of 16 discrete samples. The other type of training symbol 303 comprises the 2 identical long symbols, each of which contain Tlong×fs samples, e.g. 64 samples at fs=20 MHz. In certain embodiments, exploiting both the short and the long symbols can provide a more accurate estimation of frequency offset. In addition, by providing two sub-grouped short symbols, sub-group I and II 305, 307, an optimal frequency offset estimate can be advantageously determined. The subgroup I 305 comprises $T_{S3}$-$T_{S6}$ and these received symbols correspond one to one with transmitted symbols $S_{3S}$-$S_{6S}$ in FIG. 2. The sub-group II 307 comprises $T_{S7}$-$T_{S10}$ and these symbols correspond one to one with $S_{7S}$-$S_{10S}$ as depicted in FIG. 2. Note that the length of each sub-group, 4×16=64 samples or 4×0.8=3.2 μsec, is the same as that of a long symbol in FIG. 2. The first two short symbols ($T_{S1}$, and $T_{S2}$) allow for signal transient settling of the power amplifiert.

As shown in FIG. 3, each discretized sample of sub-group I and II is expressed as $y_S(I,n)$ and $y_S(II,n)$, respectively, and each discretized sample of long symbol I 309 and II 311 is denoted as $y_L(I,n)$ and $y_L(II,n)$, respectively. The received signals $y_S(I,n)$, $y_S(II,n)$, $y_L(I,n)$, and $y_L(II,n)$ can be expressed as Eqs. (1) to (4).

$$y_S(I,n)=[S(I,n)\otimes h(n)+N(n)]\exp(j2\pi n f_\xi/N) \quad (1)$$

where S(I,n) signals belong to $S_{3S}$, $S_{4S}$, $S_{5S}$, and $S_{6S}$ in FIG. 1.

$$y_S(II,n)=[S(II,n)\otimes h(n)+N(n)]\exp(j2\pi n f_\xi/N) \quad (2)$$

where S(II,n) signals belong to $S_{7S}$, $S_{8S}$, $S_{9S}$, and $S_{10S}$ in FIG. 1.

$$y_L(I,n)=[S_{1L}(n)\otimes h(n)+N(n)]\exp(j2\pi n f_\xi/N) \quad (3)$$

$$y_L(II,n)=[S_{2L}(n)\otimes h(n)+N(n)]\exp(j2\pi n f_\xi/N) \quad (4)$$

In Eqs. (1) to (4), h(n), N(n), and $f_\xi$ are channel impulse response, additive white Gaussian noise (AWGN), and normalized frequency offset, respectively. Note that $\otimes$ indicates a circular convolution. It is common practice to invoke the circular convolution operation in place of the linear convolution. Strictly speaking use of the circular convolution is only valid when the length of the cyclic prefix is longer than that of the channel response.

Therefore, we can specify that $$y_S(II,n)\approx y_S(I,n)\cdot e^{j2\pi f_\xi} \quad (5)$$

since the symbols are identical except for occurring at a different time and where the approximation notation would be reduced to equal notation if channel and noise effects were ignored.

and let $y_S(n)$ be $$y_S(n) = \begin{bmatrix} y_S(I,n) \\ y_S(II,n) \end{bmatrix} \quad (6)$$

Substituting Eq. (5) into Eq. (6) transforms Eq. (6) into $$y_S(n) \approx \begin{bmatrix} 1 \\ e^{j2\pi f_\xi} \end{bmatrix} y_S(I,n) \quad (7)$$

In addition, we can define a similar form for the long symbol as following $$y_L(n) \approx \begin{bmatrix} 1 \\ e^{j2\pi f_\xi} \end{bmatrix} y_L(I,n) \quad (8)$$

To get a closed solution of frequency-offset estimation, we define a cost function, essentially a least mean squares function, as follows:

$$\mathcal{J}(f_\xi) = \sum_{n=0}^{N-1} [\|y_S(n) - a(f_\xi)y_S(I,n)\|^2 + \|y_L(n) - a(f_\xi)y_L(I,n)\|^2] \quad (9)$$

where $$a(f_\xi) = \begin{bmatrix} 1 \\ e^{j2\pi f_\xi} \end{bmatrix}.$$

The frequency offset which minimizes Eq. (9) is the optimal frequency offset.

Eq. (9) can also be re-written as $$\mathcal{J}(f_\xi) = \sum_{n=0}^{N-1} [|y_S(II,n)|^2 + |y_S(I,n)|^2 + |y_L(II,n)|^2 + |y_L(I,n)|^2] - g(f_\xi) \quad (10)$$

where $$g(f_\xi) = e^{j2\pi f_\xi} \sum_{n=0}^{N-1} [y_S(I,n)y_S*(II,n) + y_L(I,n)y_L*(II,n)] + \left\{ e^{j2\pi f_\xi} \sum_{n=0}^{N-1} [y_S(I,n)y_S*(II,n) + y_L(I,n)y_L*(II,n)] \right\}* \quad (11)$$

Therefore, the minimization of Eq. (9) indicates the maximization of Eq. (11).

Equation 11 can be rewritten as follows:

$$g(f_\xi) = e^{j2\pi f_\xi} \sum_{n=0}^{N-1} [y_S(I,n)y_S*(II,n) + y_L(I,n)y_L*(II,n)] + \left\{ e^{j2\pi f_\xi} \sum_{n=0}^{N-1} [y_S(I,n)y_S*(II,n) + y_L(I,n)y_L*(II,n)] \right\}*$$

$$e^{j2\pi f_\xi} \cdot A + e^{-j2\pi f_\xi} \cdot A*$$

To get an extreme value of $g(f_\xi)$ the derivative of this equation can be taken, set to zero, and solved for $f_\xi$ as follows.

$$g'(f_\xi) = j2\pi \cdot e^{j2\pi f_\xi} \cdot A - j2\pi \cdot e^{-j2\pi f_\xi} \cdot A* = 0 \quad (12)$$

$$\Rightarrow e^{j2\pi f_\xi} \cdot A - e^{-j2\pi f_\xi} \cdot A* =$$

$$|A|e^{j[2\pi f_\xi + \arg(A)]} - |A|e^{-j[2\pi f_\xi + \arg(A)]} = 0$$

$$\Rightarrow e^{j[2\pi f_\xi + \arg(A)]} - e^{-j[2\pi f_\xi + \arg(A)]} = 0$$

$$\Rightarrow 2\pi \hat{f}_\xi + \arg(A) \pm \pi n = 0,$$

$$n = 0, 1, \ldots \infty \Rightarrow \hat{f}_\xi = -\frac{1}{2\pi}\arg(A) \text{ for } n = 0.$$

$$\Rightarrow \hat{f}_\xi = -\frac{1}{2\pi}\arg\left\{ \sum_{n=0}^{N-1} [y_S(I,n)y_S*(II,n) + y_L(I,n)y_L*(II,n)] \right\}$$

Thus the optimum frequency offset estimate is given by evaluating equation 12. This amounts to finding the complex number corresponding to the various terms summed over n=(0, 1, 2, ... N−1), in one embodiment 64 samples, finding the corresponding angle, e.g. $\tan^{-1}$ Q/I, and dividing by a negative $\frac{1}{2}\pi$.

Figure 4:
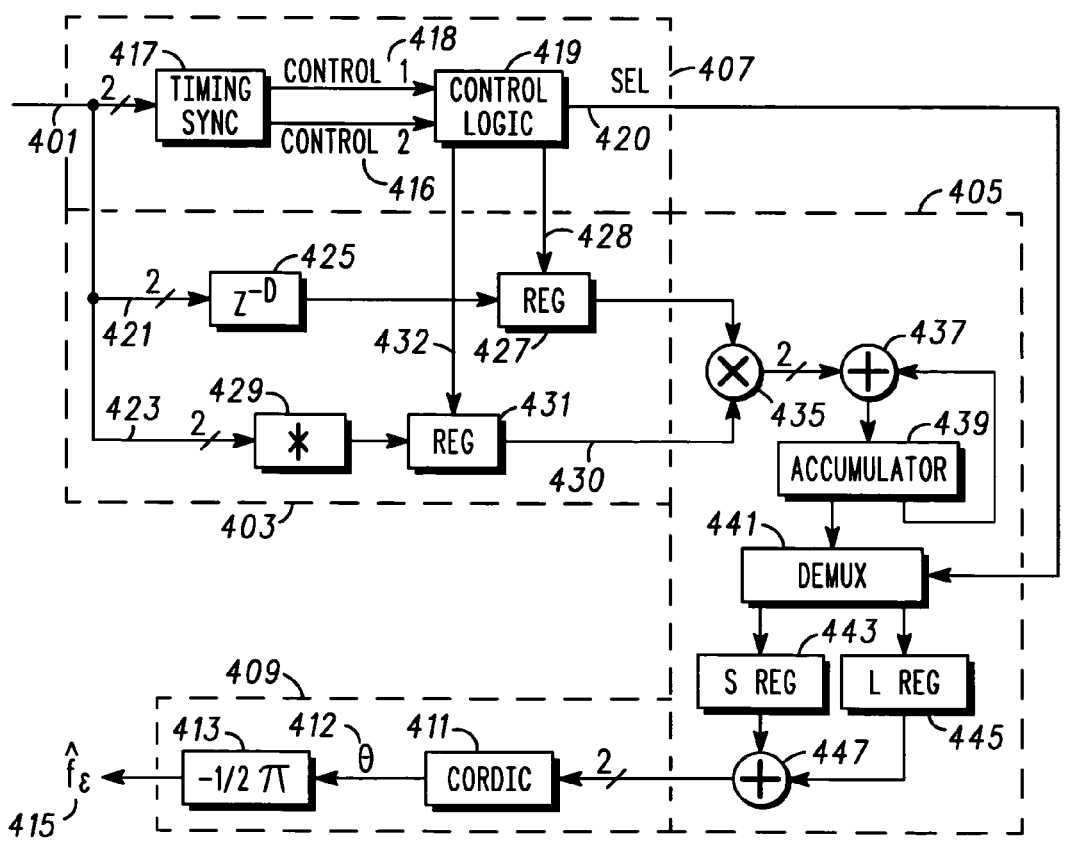
FIG. 4 depicts a block diagram of a frequency offset estimator suitable for use in an automatic frequency control portion of the FIG. 1 receiver.

Referring to FIG. 4, a block diagram of a frequency offset estimator suitable for use in an automatic frequency control portion of the FIG. 1 receiver will be discussed and described. Note that the functionality can be embodied in a special purpose or custom integrated circuit or an application specific integrated circuit with CMOS technology being particularly appropriate. Furthermore the depicted and below described functionality can be embodied as a signal processor that is arranged and executing software to perform the various functions. The functionality will likely and advantageously be included together with other functionality required to implement a receiver for an appropriate OFDM signal, where the choice between these or other embodiments is largely up to the practitioner in view of various constraints that may apply.

The frequency offset estimator or signal processor 400 is arranged to operate on an orthogonal frequency division multiplexed signal to provide or determine a frequency offset estimation. In a basic embodiment the frequency offset estimator comprises a data parser 403 that is coupled to an input signal and arranged to select a group, typically plurality, of symbols corresponding to predetermined symbols from the input signal and a processor 405 that is coupled to the symbols and arranged to provide a correlation corresponding to the symbols. The correlation corresponds to the frequency offset estimation for the input signal and further the correlation is determined in a sequential fashion so that the correlation is provided concurrently with the last symbol of the group of symbols to be selected.

In further embodiments the frequency offset estimator comprises a timing controller 407 that is operable to provide control signals to the data parser 403 and the processor 405 to coordinate the correlation of the group or plurality of symbols that are selected. As will be evident to those of ordinary skill timing can be determined by suitable auto and cross correlations between short and long symbol sequences. Peak correlation values establish frame reference timing. Further included in various embodiments of the frequency offset estimator is an output function or stage 409 for converting the correlation to the frequency offset estimation. This output function 409 determines using a known CORDIC algorithm or function 411 an angle, θ 112, specifically an inverse or arctangent corresponding to the ratio of the quadrature, Q divided by in phase, I components of the correlation ($\tan^{-1}$ Q/I) scaled by a factor of $-\frac{1}{2}\pi$ 413 to provide a frequency offset estimate, $\hat{f}_\xi$ 415 corresponding to the frequency offset $f_\xi$.

The data parser 403 is coupled to the input signal, e.g. the received signal after it has been converted from an analog waveform to digital samples at the output of A/D converter 140. These samples are complex samples that in one embodiment can be 4 or more bits, 10 bits in some embodiments, in length for each of the in phase and quadrature components. These samples are provided at a minimum rate of 20 Million samples per second (M sps) for an IEEE 802.11a embodiment. Generally the sample rate for an OFDM system can be any multiple of the minimum rate where the minimum rate is determined by the number of possible sub carriers times the lowest sub carrier frequency, e.g. in IEEE 802.11a 64 sub carriers and 312.5 kHz, respectively. The data parser includes a first data path 421 and a second data path 423 that are coupled to the input signal.

The first data path is coupled to a shift register 425 that is D samples in length, where D=64 in one embodiment that is arranged and suitable for processing an IEEE 802.11a compliant signal with a minimum sample rate=20 M sps. If the sample rate were 40 M sps, D would be 128 and so forth. The output of the D length shift register 425 is coupled to a register 427 that is activated by a first control signal 428 (provided by the timing controller 407) to provide, when activated, a sample at output 426. The second data path is coupled to a conjugate function 429 or operation that provides, at an output, the complex conjugate of samples presented at its input. These samples or complex conjugates of samples are coupled to a register 431 that is activated by a second control signal 432 to provide, when activated, a sample, specifically complex conjugate of the sample, at output 430.

Using the data parser and the respective data paths a first group of one or more symbols, such as $T_{S3}$-$T_{S6}$ comprising D samples, where D=64 or an integer multiple thereof in one IEEE 802.11a embodiment, can be selected via the first path and stored or shifted into or across the shift register 425. A second group of one or more symbols, such as $T_{S7}$-$T_{S10}$ comprising D samples can be selected via the second path and conjugated to provide a conjugated group of symbols or conjugated plurality of samples. By virtue of the shift register 425 the first group or plurality of symbols or samples, for example the first sample of $T_{S3}$ through last sample of $T_{S6}$, can be time aligned with the second group or plurality of symbols or samples, e.g. first sample of $T_{S7}$ through last sample of $T_{S10}$. Similarly the first long symbol or training symbol, $T_{L1}$ 309 can be time aligned with the second long symbol, $T_{L2}$ 311 on a sample by sample basis. Note also that D is the same value for 4 short symbols or for one long symbol. Generally at the proper time, for example at the beginning of $T_{S7}$ and $T_{L2}$, as indicated by the control signals 428, 430 the registers 427, 431 are activated and samples are provided to the processor in a sequential manner at the outputs 426, 430 of the registers. This will continue until the registers are in-activated, for example after $T_{S10}$ and $T_{L2}$.

The processor 405 includes a multiplier 435 with inputs coupled, at 426, 430, to the data parser and thus symbols or corresponding samples. The multiplier forms the complex product of the samples at 426, 430 and provides the product to an adder 437. The adder 437 sums the complex product with the contents of the accumulator 439 and stores the result in the accumulator. Note that the operation of the multiplier and adder with the accumulator forms a correlation or cross correlation of the samples at the input to the multiplier and thus corresponding symbols (after all corresponding samples have been processed) that is provided at the output of the accumulator 439. The accumulator output is coupled to a de-multiplexer 441 that is controlled by a select signal 420 from the timing controller 407.

At the appropriate time, for example the end of $T_{S10}$, the select signal 420 will direct the de-multiplexer 441 to pass the accumulator contents to the SRegister 443 and reset the accumulator. Again at the appropriate time, for example the end of $T_{L2}$ the select signal will direct or control the de-multiplexer 420 to pass the contents of the accumulator to the LRegister 445 and again reset the accumulator 439. Note that with the above discussed operation and timing the contents of the SRegister 443 and the LRegister 445 are, respectively, a cross correlation of the first sub group 305 of short symbols with the second sub group 307 of short symbols and a cross correlation of the first long symbol 309 with the second long symbol 311 in the exemplary IEEE 802.11a embodiment. The contents of these registers 443, 445 are combined by adder 447 to provide a correlation that corresponds to a frequency offset estimate.

This correlation is a complex number that is provided to the output function, specifically CORDIC function that determines the corresponding angle, etc to provide the offset frequency estimation 415.

This frequency offset estimator in certain embodiments includes the data parser that is further arranged to select the group of the symbols comprising a first group of symbols corresponding to first predetermined symbols, such as the short symbols $T_{S3}$-$T_{S10}$) and a second group of symbols corresponding to second predetermined symbols, such as the long symbols $T_{L1}$, $T_{L2}$ and the processor is operable to provide a first cross correlation corresponding to the first group of symbols, to provide a second cross correlation corresponding to the second group of symbols, and to combine the first cross correlation with the second cross correlation to provide the correlation.

In other embodiments, the data parser 403 is further arranged to select the group of the symbols comprising a first group of symbols, such as sub group I 305 and a second group of symbols, such as sub group II 307, to delay the first group of symbols to provide a delayed group of symbols, and to conjugate the second group of symbols to provide a conjugated group of symbols, where the delayed group of symbols is time aligned with the conjugated group of symbols; and the processor is operable to provide a cross correlation of the delayed group of symbols with the conjugated group of symbols. Furthermore in additional embodiments the data parser is further arranged to select the group of the symbols comprising a third symbol, such as the first long symbol 309 and a fourth symbol, such as the second long symbol 311, to delay the third symbol to provide a delayed symbol, and to conjugate the fourth symbol to provide a conjugated symbol, where the delayed symbol is time aligned with the conjugated symbol and the processor is operable to provide an other cross correlation of the delayed symbol with the conjugated symbol and to combine the cross correlation with the other cross correlation to provide the correlation.

The frequency offset estimator arranged and configured as described above may be particularly advantageous used in a receiver, such as wireless LAN receiver, for receiving an IEEE 802.11a compatible OFDM signal. Note further that the frequency offset estimator as arranged and configured in FIG. 4 will operate to determine the frequency offset estimation according to equation (12), namely:

$$\hat{f}_\xi = -\frac{1}{2\pi}\arg\left\{\sum_{n=0}^{N-1}[y_S(I,n)y_S*(II,n) + y_L(I,n)y_L*(II,n)]\right\},$$

where $f_\xi$ is the frequency offset, $y_S(I,n)$ are samples corresponding to a first group of 4 short symbols, $y_S^*(II,n)$ are complex conjugates of samples corresponding to a second group of 4 short symbols, $y_L(I,n)$ are samples corresponding to a first long symbol, and $y_L^*(II,n)$ are complex conjugates of samples corresponding to a second long symbol.

The functionality of the apparatus of FIG. 4 can also be implemented in alternative embodiments as a signal processor that is arranged and constructed and possibly executing software to determine a frequency offset estimate. The signal processor will thus be operable to select samples from an input signal to provide selected samples where the selected samples correspond to a first known symbol and a second known symbol with the first and the second known symbol being identical. Further the signal processor will process the selected samples to provide a cross correlation of the selected samples corresponding to the first known symbol with the selected samples corresponding to the second known symbol, where the cross correlation corresponds to a frequency offset estimate for the input signal. The cross correlation can be determined in a sequential sample by sample fashion so that the cross correlation is provided concurrently with the last sample to be selected thereby minimizing any delay in providing the frequency offset estimation. The signal processor will need to be operable to provide control signals corresponding to symbol timing to coordinate the selecting and the processing of the selected samples and further be operable to convert the correlation to the frequency offset estimate by performing a CORDIC algorithm on the correlation.

In other embodiments, the signal processor is further operable to select additional samples from the input signal to provide additional selected samples, the additional selected samples corresponding to a third known symbol and a fourth known symbol where the third and the fourth known symbol are identical and process the additional selected samples to provide an additional cross correlation corresponding to the third and the fourth known symbol. The additional cross correlation also corresponds to a frequency offset estimate for the input signal and is determined in part on a sequential sample by sample fashion so that the additional cross correlation is provided concurrently with the last additional sample to be selected. The cross correlation and the additional cross correlation are combined to provide a correlation and the correlation is converted to the frequency offset estimate.

Note that the structure and operations as discussed above will yield the frequency offset estimate concurrently with the last sample or nearly instantaneously (i.e. superlinear) after the end of the $T_{L2}$, with a latency determined only by the CORDIC function or processor. If, for example, the CORDIC function requires 16 clock cycles, the latency is only 0.2 usec at an 80 MHz clock rate. Therefore, the invention can be used to immediately improve the carrier frequency estimate and thus received data demodulation and recovery.

Referring to FIG. 5, an exemplary graph of performance results for the frequency offset estimator of FIG. 4 will be discussed and described. FIG. 5 shows results from an experimental simulation. The result exhibits mean squared error (MSE) 501 between actual frequency offset and a frequency offset estimate versus signal-to-noise ratio (SNR) 503. FIG. 5 shows the MSE's for sub-grouped short preamble symbols only 505, long preamble symbols only 507, and the combination of sub-grouped short and long preamble symbols 509. Simulation conditions utilized an indoor channel model and normalized frequency offset of 20%. Note that the long preamble symbols are usually utilized for a fine estimation of frequency offset, while the short preamble symbols are used for a coarse estimation of frequency offset. The course estimation of frequency offset is normally thought to only provide some adjustment for potentially extremely false estimates of fine estimation in an abnormal channel condition, but does not improve performance of fine estimation under "normal" channel conditions. However, the simulation result shows that the present invention has a surprising improvement of at lease 3.5 dB gain over the conventional long-preamble method in MSE when SNR≧4 dB. Eq. (13) shows an expression for MSE in dB that was used in the simulation to indicate the simulated performance.

$$MSE\_dB = 10\log_{10}(MSE) \quad (13)$$

FIG. 6 illustrates a flow chart of a method embodiment for estimating frequency offset for an OFDM signal. The method 600 is one of determining a frequency offset estimate for an orthogonal frequency division multiplexed signal. Some of this discussion will be in the nature of a review and summary of portions of the discussions above and the reader is referred to those discussions for further details. The method is particularly suitable for use in a wireless communication unit or specifically a receiver that is using protocols and modulation techniques where the process is applicable, for example IEEE 802.11a systems, and the like. The apparatus of FIG. 4 can advantageously perform the method 600 although various other structures or apparatus would also be suitable for performing this method.

The method 600 starts at 601 and in the basic embodiment at 603, selecting samples from an input signal to provide selected samples where the selected samples correspond to known symbols is undertaken. Then at 605, the method shows processing the selected samples to provide a correlation corresponding to the known symbols. The correlation corresponds to a frequency offset estimation for the input signal and the correlation is determined in a sequential, sample by sample, fashion so that the correlation is provided concurrently with the last sample to be selected. The processes at 603, 605 in further embodiments are provided at 607 with control signals corresponding to symbol timing in order to coordinate the selecting and the processing of the selected samples. After the process at 605, the method in additional embodiments includes converting the correlation to the frequency offset estimation at 609 by determining an angle corresponding to the correlation, via a CORDIC operation, and proper scaling, e.g. by $-\frac{1}{2}\pi$.

In more detailed embodiments the process of 603, 605 includes further processes at 611-615, 617. At 615 the selecting the samples at 603 further comprises selecting a first plurality of samples and a second plurality of samples and at 613 delaying the first plurality of samples to provide a delayed plurality of samples and further at 615 forming a complex conjugate of each of the second plurality of samples to provide a conjugated plurality of samples, where by virtue of the delaying process, the delayed plurality of samples is time aligned with the conjugated plurality of samples. The processing the selected samples at 605 further includes processing the first and second plurality of samples at 617 to provide a cross correlation of the delayed plurality of samples with the conjugated plurality of samples.

In further embodiments the selecting the samples at 603 further comprises at 619 selecting a third plurality of samples and a fourth plurality of samples, at 621 delaying the third plurality of samples to provide an other delayed plurality of samples, and at 623 forming a complex conjugate of each of the fourth plurality of samples to provide an other conjugated plurality of samples, where the other delayed plurality of samples is time aligned with the other conjugated plurality of samples. Then the processing the selected samples at 605 further comprises processing the third and fourth plurality of samples at 625 to provide an other cross correlation of the other delayed plurality of samples with the other conjugated plurality of samples. At 627 the cross correlation and the other cross correlation are combined, via the adder, to provide the correlation.

The selecting the samples at 611 may be viewed as selecting a first plurality of samples corresponding to first known symbols and at 619 as selecting a second plurality of samples corresponding to second known symbols. The processing the selected samples at 617, 625 provides, respectively, a first cross correlation corresponding to the first plurality of samples and provides a second cross correlation corresponding to the second plurality of samples and then combining the first cross correlation with the second cross correlation to provide the correlation at 627. This method can be advantageously utilized in a receiver for receiving an IEEE 802.11a compatible OFDM signal and when so utilized can determine the frequency offset estimation according to the following equation (see equation 12 above):

$$\hat{f}_\xi = -\frac{1}{2\pi}\arg\left\{\sum_{n=0}^{N-1}[y_S(I,n)y_S*(II,n) + y_L(I,n)y_L*(II,n)]\right\},$$

Thus a novel and advantageous approach and structure has been described and discussed that directly determines or calculates, an optimum frequency offset estimate corresponding to an OFDM signal for use in, for example, a receiver. Note that significant flexibility exists in the apparatus of FIG. 4. For example, the shift register length D can be varied thus allowing different time alignments between different portions of the received samples. For example two short symbols could be aligned and cross correlated using a D=16 and then two long symbols could be aligned and cross correlated using a D=64. The important thing is that the symbols or group of symbols or corresponding samples be the same or identical or that a known transformation be available for converting different known symbols so they are equivalent.

The apparatus, processes, and systems discussed above and the inventive principles thereof can alleviate problems caused by present approaches for estimating frequency offset for OFDM receivers as well as offer a novel and advantageous methodology for providing such frequency offset estimations for use, for example in a wireless communications receiver or device. Using the above discussed principles of selecting samples and delaying these samples to perform a cross correlation with other selected samples and using this cross correlation to provide a frequency offset estimation for an OFDM signal, in a direct computationally efficient manner exhibiting minimal delay to yield an optimum frequency offset estimation for use in receiving the OFDM signal will facilitate a cost effective, efficient, and practical approach for improving OFDM receivers thereby increasing system performance and contributing to user satisfaction.

It is expected that one of ordinary skill given the above described principles, concepts and embodiments will be able to implement other alternative procedures and structures that may be communications device or protocol dependent and that will also offer additional quick and efficient procedures for facilitating frequency offset calculations and estimates for a receiver. It is anticipated that the claims below cover many such other procedures and structures.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A frequency offset estimator for an orthogonal frequency division multiplexed signal comprising:
   a data parser coupled to an input signal and arranged to select a group of symbols corresponding to predetermined symbols from the input signal;
   a processor coupled to the symbols and arranged to provide a correlation corresponding to the symbols, where the correlation corresponds to a frequency offset estimation for the input signal and the correlation is determined in a sequential fashion so that the correlation is provided concurrently with the last symbol of the group of symbols to be selected; and
   an output function for converting the correlation to the frequency offset estimation.

2. The frequency offset estimator of claim 1 further comprising a timing controller operable to provide control signals to the data parser and the processor to coordinate the correlation of the group of symbols that are selected.

3. The frequency offset estimator of claim 1:
   wherein the data parser is further arranged to select the group of the symbols comprising a first group of symbols and a second group of symbols, to delay the first group of symbols to provide a delayed group of symbols, and to conjugate the second group of symbols to provide a conjugated group of symbols, where the delayed group of symbols is time aligned with the conjugated group of symbols; and
   wherein the processor is operable to provide a cross correlation of the delayed group of symbols with the conjugated group of symbols.

4. The frequency offset estimator of claim 3:
   wherein the data parser is further arranged to select the group of the symbols comprising a third symbol and a fourth symbol, to delay the third symbol to provide a delayed symbol, and to conjugate the fourth symbol to provide a conjugated symbol, where the delayed symbol is time aligned with the conjugated symbol; and
   wherein the processor is operable to provide an other cross correlation of the delayed symbol with the conjugated symbol and to combine the cross correlation with the other cross correlation to provide the correlation.

5. The frequency offset estimator of claim 1:
   wherein the data parser is further arranged to select the group of the symbols comprising a first group of symbols corresponding to first predetermined symbols and a second group of symbols corresponding to second predetermined symbols; and
   wherein the processor is operable to provide a first cross correlation corresponding to the first group of symbols, to provide a second cross correlation corresponding to the second group of symbols, and to combine the first cross correlation with the second cross correlation to provide the correlation.

6. The frequency offset estimator of claim 1 arranged and configured for use in a receiver for receiving an IEEE 802.11a compatible OFDM signal.

7. The frequency offset estimator of claim 6 arranged and configured to determine the frequency offset estimation according to:

$$\hat{f}_\xi = -\frac{1}{2\pi}\arg\left\{\sum_{n=0}^{N-1}[y_S(I,n)y_S*(II,n) + y_L(I,n)y_L*(II,n)]\right\},$$

where $f_\varepsilon$ is the frequency offset, $y_S(I,n)$ are samples corresponding to a first group of 4 short symbols, $y_S^*(II,n)$ are complex conjugates of samples corresponding to a second group of 4 short symbols, $y_L(I,n)$ are samples corresponding to a first long symbol, and $y_L^*(I,n)$ are complex conjugates of samples corresponding to a second long symbol.

8. A method of determining a frequency offset estimate for an orthogonal frequency division multiplexed signal comprising:
    selecting samples from an input signal to provide selected samples, the selected samples corresponding to known symbols;
    processing, in a processor, the selected samples to provide a correlation corresponding to the known symbols, where the correlation corresponds to a frequency offset estimation for the input signal and the correlation is determined in a sequential sample by sample fashion so that the correlation is provided concurrently with the last sample to be selected; and
    converting the correlation to the frequency offset estimation by determining an angle corresponding to the correlation.

9. The method of claim 8 further comprising providing control signals corresponding to symbol timing to coordinate the selecting and the processing of the selected samples.

10. The method of claim 8 wherein the selecting the samples further comprises:
    selecting a first plurality of samples and a second plurality of samples;
    delaying the first plurality of samples to provide a delayed plurality of samples;
    forming a complex conjugate of each of the second plurality of samples to provide a conjugated plurality of samples, where the delayed plurality of samples is time aligned with the conjugated plurality of samples; and
    wherein the processing the selected samples further provides a cross correlation of the delayed plurality of samples with the conjugated plurality of samples.

11. The method of claim 10: wherein the selecting the samples further comprises:
    selecting a third plurality of samples and a fourth plurality of samples;
    delaying the third plurality of samples to provide an other delayed plurality of samples;
    forming a complex conjugate of each of the fourth plurality of samples to provide an other conjugated plurality of samples, where the other delayed plurality of samples is time aligned with the other conjugated plurality of samples; and
    wherein the processing the selected samples further provides an other cross correlation of the other delayed plurality of samples with the other conjugated plurality of samples and combines the cross correlation with the other cross correlation to provide to correlation.

12. The method of claim 8:
    wherein the selecting the samples further comprises selecting a first plurality of samples corresponding to first known symbols and a second plurality of samples corresponding to second known symbols; and
    wherein the processing the selected samples further provides a first cross correlation corresponding to the first plurality of samples and provides a second cross correlation corresponding to the second plurality of samples, and combines the first cross correlation with the second cross correlation to provide the correlation.

13. The method of claim 1 utilized in a receiver for receiving an IEEE 802.1a compatible OFDM signal.

14. The method of claim 8 arranged and configured to determine the frequency offset estimation according to:

$$\hat{f}_\varepsilon = -\frac{1}{2\pi}\arg\left\{\sum_{n=0}^{N-1}[y_S(I,n)y_S*(II,n) + y_L(I,n)y_L*(II,n)]\right\},$$

where $f_\varepsilon$ is the frequency offset, $y_S(I,n)$ are samples corresponding to a first group of 4 short symbols, $y_S^*(II,n)$ are complex conjugates of samples corresponding to a second group of 4 short symbols, $y_L(I,n)$ are samples corresponding to a first long symbol, and $y_L^*(I,n)$ are complex conjugates of samples corresponding to a second long symbol.

15. A signal processor arranged and constructed and executing software to determine a frequency offset estimate, the signal processor operable to:
    select samples item an input signal to provide selected samples, the selected samples corresponding to a first known symbol and a second known symbol where the first and the second known symbol are identical; and
    process the selected samples to provide a cross correlation of the selected samples corresponding to the first known symbol with the selected samples corresponding to the second known symbol, where
        the cross correlation corresponds to a frequency offset estimate for the input signal, and
        the cross correlation is determined in a sequential sample by sample fashion so that the cross correlation is provided concurrently with the last sample to be selected;
    select additional samples from the input signal to provide additional selected samples, the additional selected samples corresponding to a third known symbol and a fourth known symbol where the third and the fourth known symbol are identical;
    process the additional selected samples to provide an additional cross correlation corresponding to the third known symbol and the fourth known symbol, where
        the additional cross correlation corresponds to a frequency offset estimate for the input signal, and
        the additional cross correlation is determined in part on a sequential sample by sample fashion so that the additional cross correlation is provided concurrently with the last additional sample to be selected;
    combine the cross correlation and the additional cross correlation to provide a correlation; and
    convert the correlation to the frequency offset estimate.

16. The signal processor of claim 15 further operable to provide control signals corresponding to symbol timing to coordinate the selecting and the processing of the selected samples.

17. The signal processor of claim 15 further operable to convert the correlation to the frequency offset estimate by performing a cordic algorithm on the correlation.

* * * * *

UNITED STATES PATENT AND TRADEMARK OFFICE
CERTIFICATE OF CORRECTION

PATENT NO. : 7,787,357 B2  Page 1 of 1
APPLICATION NO. : 10/740291
DATED : August 31, 2010
INVENTOR(S) : Kelley et al.

It is certified that error appears in the above-identified patent and that said Letters Patent is hereby corrected as shown below:

Column 15 line 5 please delete "$y_L*(l,n)$ and insert -- $y_L*(ll,n)$ --

Column 16 line 18 please delete "$y_L*(l,n)$ and insert -- $y_L*(ll,n)$ --

Column 16 line 23 please delete "item" and insert -- from --

Signed and Sealed this
Eleventh Day of January, 2011

David J. Kappos
*Director of the United States Patent and Trademark Office*